United States Patent [19]

Nomura et al.

[11] Patent Number: 5,757,123
[45] Date of Patent: May 26, 1998

[54] ELECTRON-BEAM GENERATOR AND IMAGE DISPLAY APPARATUS MAKING USE OF IT

[75] Inventors: Ichiro Nomura, Atsugi; Toshihiko Takeda, Tokyo; Yoshikazu Banno, Atsugi; Tetsuya Kaneko, Yokohama; Haruhito Ono, Minami-ashigara; Hidetoshi Suzuki, Atsugi, all of Japan

[73] Assignee: Canon Kabushiki Kaisha, Tokyo, Japan

[21] Appl. No.: 305,852

[22] Filed: Sep. 14, 1994

Related U.S. Application Data

[63] Continuation of Ser. No. 920,916, Jul. 28, 1992, abandoned, which is a continuation of Ser. No. 497,072, Mar. 21, 1990, Pat. No. 5,185,554.

[30] Foreign Application Priority Data

Mar. 23, 1989 [JP] Japan ................. 1-069389
Nov. 10, 1989 [JP] Japan ................. 1-290979

[51] Int. Cl.$^6$ ............................................. H01J 31/15
[52] U.S. Cl. .................................................. 313/495
[58] Field of Search ............................. 313/309, 336, 313/351

[56] References Cited

U.S. PATENT DOCUMENTS

| 4,361,781 | 11/1982 | Depp et al. |  |
|---|---|---|---|
| 4,712,039 | 12/1987 | Hong | 313/307 |
| 4,827,177 | 5/1989 | Lee et al. | 313/306 |
| 4,904,895 | 2/1990 | Tsukamoto et al. | 313/336 |
| 4,954,744 | 9/1990 | Suzuki et al. | 313/336 |
| 5,185,554 | 2/1993 | Nomura et al. | 313/495 |

FOREIGN PATENT DOCUMENTS

| 0217003 | 4/1987 | European Pat. Off. |
|---|---|---|
| 0249968 | 12/1987 | European Pat. Off. |
| 0354750 | 2/1990 | European Pat. Off. |

*Primary Examiner*—Sandra L. O'Shea
*Attorney, Agent, or Firm*—Fitzpatrick, Cella, Harper & Scinto

[57] ABSTRACT

An electron-beam generator comprises an electron-emitting device and a modulating electrode capable of modulating an electron beam emitted from the electron-emitting device in response to an information signal. The modulating electrode and the electron-emitting device are laminated so as to interpose an insulating substrate therebetween.

21 Claims, 8 Drawing Sheets

ELECTRON-BEAM GENERATOR AND IMAGE DISPLAY APPARATUS MAKING USE OF IT

This application is a continuation of application Ser. No. 07/920,916, filed Jul. 28, 1992, now abandoned, which is a continuation Ser. No. 497,072 filed Mar. 21, 1990 of U.S. Pat. No. 5,185,554, issued Feb. 9, 1993.

BACKGROUND OF THE INVENTION

Field of the Invention

The present invention relates to an electron-beam generator capable of emitting electron beams in accordance with information signals. It also relates to an image display apparatus making use of the electron-beam generator.

Related Background Art

In the art, there are thin-gage image display apparatus comprising a plurality of electron-emitting 15 devices arranged in a plane form and fluorescent member targets individually receiving irradiation of electron beams from the electron-emitting devices, both of which are respectively face-to-face.

These electron-beam image display apparatus basically have the following structure.

FIG. 11 is an exploded perspective view to schematically illustrate a conventional display apparatus. The numeral 1 denotes a rear plate; 2, a support; 3, a wiring electrode; 4, an electron-emitting area; 5, an electron-passing aperture; 6, a modulating electrode; 7, a glass plate; 8, a transparent electrode; and 9, an image forming member, which comprises a member capable of emitting light, causing a change in color, being electrically charged, and causing a change in properties as a result of impingement of electrons, as exemplified by a fluorescent member and a resist material. The numeral 10 denotes a face plate; and 12, a luminescent spot. The electron-emitting area 4 is formed by a thin-film technique, and constitutes a bridge structure so that it may not come into contact with the rear plate 1. The wiring electrode 3 may be formed using the same materials as those for an electron-emitting member, or using different materials. Those having high melting point and small electrical resistivity are commonly used. The support 2 is formed of an insulating material or a conductive material.

In these electron-beam image display apparatus, a voltage is applied to the wiring electrode 3, so that electrons are emitted from the electron-emitting area that constitutes the hollow structure, and electrons are taken out by applying a voltage to the modulating electrode 6 capable of modulating a flow of the electrons thus emitted, in accordance with information signals, and the electrons thus taken out are impinged against the fluorescent member 9. An XY matrix is also formed by the wiring electrode 3 and the modulating electrode 6, and thus an image is displayed on the image forming member, i.e., the fluorescent member 9.

The above conventional electron-beam image display apparatuses have the following problems:

(1) Since the modulating electrode 6 is disposed above an electron-emitting device (comprised of the support 2, the wiring electrode 3 and the electron-emitting area 4) and in the direction of the emission of electrons as shown in FIG. 11, the electron-passing aperture 5 of the modulating electrode 6 and the electron-emitting area 4 can be difficult to aligned with each other. Hence, it is difficult to manufacture a wide-screen image display apparatus with high definition.

(2) Since both the modulating electrode 6 and the electron-emitting area 4 of the electron-emitting device are disposed in such a way that a space is given between them as shown in FIG. 11, the distance between the modulating electrode 6 and the electron-emitting area 4 of the electron-emitting device can not be kept uniform. In particular, in the case when a plurality of electron-emitting devices are provided, the distances between all the electron-emitting areas and modulating electrode(s) can be made uniform with difficulty. Hence, it is difficult to manufacture a wide-screen, highly detailed image display apparatus.

(3) An attempt to manufacture the wide-screen, highly detailed image display apparatus may result in a serious luminance non-uniformity of a displayed image.

FIG. 12 shows another example of the conventional electron-beam image display apparatus. In FIG. 12, the numeral 21 denotes a substrate; 22, a modulating electrode; 23, a thermoelectron beam source; 24, an upper deflecting electrode; 25, a lower deflecting electrode; and 26, a face plate provided with a transparent electrode and an image forming member, which is capable of emitting light, causing a change in color, being electrically charged, and causing a change in properties as a result of impingement of electrons, as exemplified by a fluorescent member and a resist material. The thermoelectron beam source comprises a tungsten wire coated with an electron-emitting material, and has an outer diameter of about 35 μm and an operation temperature of from 700° to 850° C.

In the conventional electron-beam image display apparatus as shown in FIG. 12, the modulating electrode 22 is disposed on the side opposite to the direction of electron emission, of the thermoelectron beam source (an electron-emitting device) 23. Hence, although the above problem (1) can be eliminated, the above problems (2) and (3) can not be eliminated.

SUMMARY OF THE INVENTION

Accordingly, an object of the present invention is to provide an electron-beam generator, and an image display apparatus making use of it, that can be prepared with ease because of the easiness in the alignment between modulating electrodes and electron-emitting areas.

Another object of the present invention is to provide an electron-beam generator, and an image display apparatus making use of it, that can display an image free of any luminance non-uniformity.

The above objects of the present invention can be achieved by the invention as described below.

The present invention provides an electron-beam generator comprising an electron-emitting device and a modulating electrode capable of modulating an electron beam emitted from the electron-emitting device, in accordance with an information signal; wherein the modulating electrode and the electron-emitting device are so laminated as to interpose an insulating substrate therebetween.

In another embodiment, the present invention provides an electron-beam generator comprising an electron-emitting device and a modulating electrode capable of modulating an electron beam emitted from the electron-emitting device, in accordance with an information signal; wherein the electron-emitting device and the modulating electrode are disposed on the same plane of an insulating substrate.

The present invention also provides an image display apparatus comprising an electron-emitting device, a modulating electrode capable of modulating an electron beam emitted from the electron-emitting device, in accordance with an information signal, and an image forming member capable of forming an image by irradiation with the electron beam; wherein the modulating electrode, the electron-emitting device and the image forming member are disposed in this order, and the modulating electrode and the electron-emitting device is so laminated as to interpose an insulating substrate therebetween.

In another embodiment of the image display apparatus, the present invention provides an image display apparatus comprising an electron-emitting device, a modulating electrode capable of modulating an electron beam emitted from the electron-emitting device, in accordance with an information signal, and an image forming member capable of forming an image by irradiation with the electron beam; wherein the modulating electrode and the electron-emitting device are disposed on the same plane of an insulating substrate.

Figure 1:
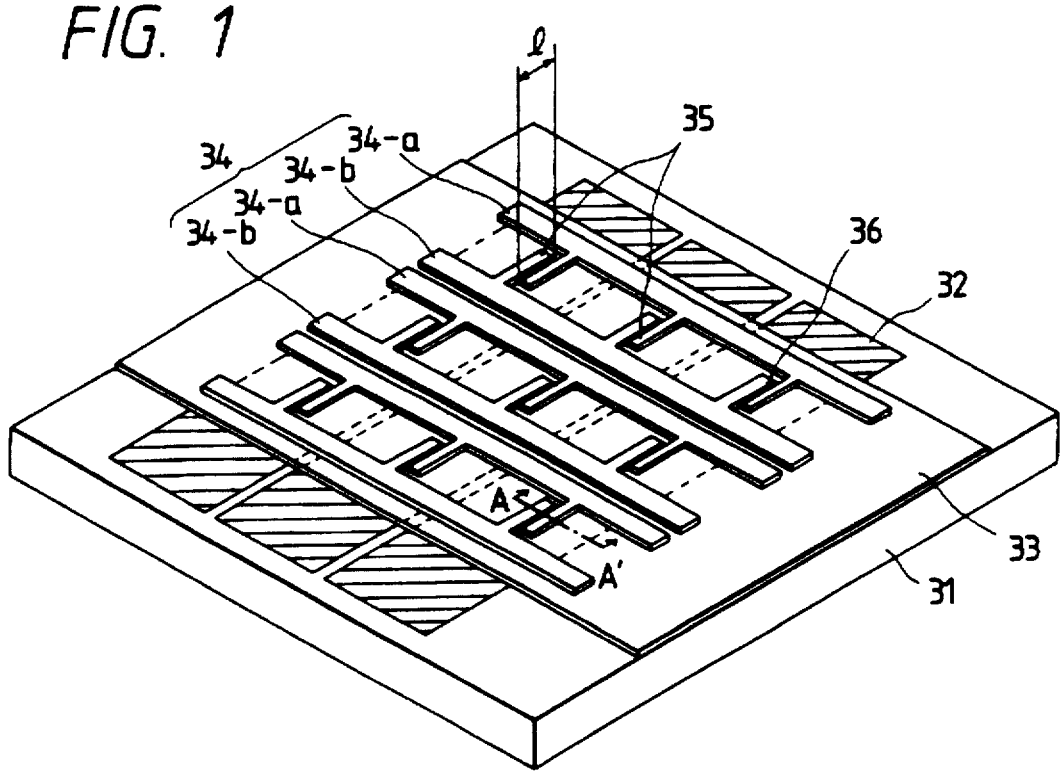
FIGS. 1, 3, 5, 8 and 9 are views each illustrating the electron-beam generator of the present invention, which are also used in explaining the image display apparatus of the present invention.

DETAILED DESCRIPTION OF THE PREFERRED EMBODIMENTS:

The present inventors noted the relation between i) the difficulty aligning the modulating electrode the electron-emitting area of the electron-emitting device in the conventional image display apparatus, the difficulty being the problem in its manufacture as above-discussed, and ii) the non-uniform display that occurs in the apparatus when the wide-screen image display apparatus with high definition is manufactured, on the basis of which they made intensive studies. As a result, they found that a slight positional deviation between the aperture through which the electron beam passes and the electron-emitting area of the electron-emitting device greatly influences the flying of the electron beam that reaches the image forming member, and causes non-uniform luminance on the image forming member. They also found that the differences in distance between individual modulating electrodes and individual electron-emitting areas of the electron-emitting device greatly influence the flying of the electron beams that reach the image forming member, resulting in non-uniform luminance on the image forming member. Based on the above findings, they have achieved the present invention having the above constitution as an image display apparatus that has eliminated the disadvantage of display non-uniformity (luminance non-uniformity).

The present invention will be described in detail.

The present invention is mainly characterized by the constitution that the electron beam source, i.e., the electron-emitting device and the modulating electrode capable of modulating the electron beam emitted from the electron-emitting device are held on the same substrate.

The electron-emitting device in the present invention may be any of a hot cathode and a cold cathode so long as they are those conventionally used as electron sources of image display apparatus. In the case of the hot cathode, however, the electron-emission efficiency may be lowered because of the diffusion of heat to the substrate. Thermoelectron-emitting devices also have the relation of $J \, 1/d^2$ in respect of the amount of electron emission (J) and the distance (d) between the device and the modulating electrode, so that the amount of electron emission greatly changes even with a slight change of the distance of the modulating electrode and the device. Hence, in instances in which a plurality of electron-emitting devices are arranged, thermal strain may cause uniformity in the distances between the devices and the modulating electrode, resulting in a serious uniformity in the amount of electron emission. Hence, the cold cathodes are preferred. In addition, among the cold cathodes, it is particularly preferred to use an electron-emitting device called the surface-conductive electron-emitting device, because the electron-beam generator and the image display apparatuses of the present invention have the advantages that;

1) they can achieve a high electron-emission efficiency;

2) they are simple in construction and hence can be manufactured with ease;

3) a number of devices can be formed by arranging them on the same substrate;

4) they can attain a high speed of response; and 5) they have superior luminance contrast.

In particular, the above advantage (5) is greatly attributable to the fact that the surface conductance electron-emitting device is a thin-film device. More specifically, in the present invention, the modulating electrode is disposed on the side opposite to the side at which the electron-emitting device emits electrons, or on the same plane on which the electron-emitting device is provided. Hence, when the electron-emitting device is too thick (i.e., the thickness in the direction of electron-beam emission is large), there becomes an excessively large distance between the modulating electrode and the electron-emitting surface of the electron-emitting device, whereby the electron beams emitted can not be well modulated, thus bringing about another problem that luminance contrast becomes poor. Accordingly, the electron-emitting device used in the present invention may preferably have a thickness (i.e., distance from the surface of a substrate to the surface from which electrons are emitted) of from 100 Å to 200 µm. In order to obtain a superior luminance contrast, it is desirable, as previously mentioned, to use an electron-emitting device wherein the device such as the surface-conductive electron-emitting device has a thickness (in this instance, corresponding to the the thickness of a device electrode) of from 100 Å to 10 µm. Here, the surface-conductive electron-emitting device refers to a cold cathode device presented by M. I. Elinson et al., Radio Engineering Electron Physics (Radio Eng. Electron. Phys.), Vol. 10, pp.1290–1296, 1965. This is a device comprising a substrate, electrodes (device electrodes) provided on its surface, and a thin film with a small area (an electron-emitting area) formed between the electrodes, where a voltage is applied between said electrodes (device electrodes) so that an electric current flows parallel to the surface of the film, and electrons are thus emitted. This includes those reported as devices employing a $SnO_2(Sb)$ thin film developed by Elinson et al named above, as well as those comprising an Au thin film, (G. Dittmer, "Thin Solid Films", Vol. 9, p.317, 1972), those comprising an ITO thin film, (M. Hartwell and C. G. Fonstad, "IEEE Trans. ED Conf.", p.519, 1975), and those comprising a carbon thin film [Hisasi Araki, "SHINKU" (Vacuum), Vol. 26, No. 1, p.22, 1983].

The surface-conductive electron-emitting devices usable in the present invention may be, in addition to the above, those in which the electron-emitting areas thereof are formed by dispersion of metallic fine powder, as will be described later.

In the present invention, the modulating electrode refers to an electrode for controlling the ON/OFF of the electron beams emitted from the electron-emitting device by applying a voltage in accordance with an information signal, and may be formed of any materials so long as they are conductive materials.

In the present invention, the insulating substrate refers to a substrate on which both the electron-emitting device and the modulating electrode are held in an electrically insulating state; and may be formed of any materials so long as they are insulating materials. If the substrate possessed by the electron-emitting device, for example, the substrate on which the device electrode and the electron-emitting area are provided in the above surface-conductive electron-emitting device is comprised of an insulating material, the insulating substrate may also comprise such a substrate. The insulating substrate as described above is so formed as to have a uniform thickness so that the distance between the modulating electrode and the electron-emitting surface of the electron-emitting device may be equal with respect to all the electron-emitting devices. In other words, that the distance is equal with respect to all the electron-emitting devices indicates the minimum distance between any point on the electron-emitting surface of any electron-emitting device and modulating electrode is kept substantially constant.

In a preferred constitution or embodiment of the present invention, a group of linear electron-emitting devices each comprising electron-emitting devices arranged in plurality and a group of modulating electrodes comprising a plurality of modulating electrodes are so disposed (arranged in line) as to constitute an XY matrix, and the above linear electron-emitting devices and the above modulating electrode are each independently equipped with a voltage-applying means.

In the present invention, the modulating electrode is provided beneath the electron source, or on the same plane with regard to the electron source is provided. It is also possible to take the constitution that the modulating electrode is provided above the electron source and at the same time integrally with the electron source. In the instance here the modulating electrode is provided above the electron source, however, the problems (1) and (3) previously mentioned may still arise. Moreover, when the surface conductive electron-emitting device is used as a component member of the present invention, an insulating material film must be formed on the device and also a processing step must be added, before the modulating electrode is provided on the device. Since in the surface-conductive electron-emitting device the electron-emitting areas are uncovered to the surface of an insulating material as previously mentioned, the formation of an insulating material film on the electron-emitting areas and the processing thereof may bring about various deteriorations and further cause deterioration of characteristics. Thus, the present invention can be said to have the function that can eliminate the above problems without causing any new problems.

The first invention described below;

includes electron-beam generator comprising an electron-emitting device and a modulating electrode capable of modulating an electron beam emitted from said electron-emitting device, in accordance with an information signal; wherein the modulating electrode and the electron-emitting device are so laminated as to interpose an insulating substrate therebetween.

An image display apparatus making use of the generator, i.e., the image display apparatus; comprises an electron-emitting device, a modulating electrode capable of modulating an electro n beam emitted from said electron-emitting device, in accordance with an information signal, and an image forming member capable of forming an image by irradiation with said electron beam; wherein the modulating electrode, the electron-emitting device and the image forming member are successively disposed, and the modulating electrode and the electron-emitting device are so laminated as to interpose an insulating substrate therebetween (hereinafter "the apparatus (A) of the present invention ").

In the apparatus (A) of the present invention, a uniform thickness of the insulating substrate keeps substantially equal the distances between the electron-emitting areas of the plural electron-emitting devices and the modulating electrodes. When its thickness is too small, there is caused a faulty insulation between the electron-emitting generators and modulating electrodes. On the other hand, When the thickness is too large, there occurs an insufficient modulation of electron beams, causing a faulty luminance contrast, or resulting in an increase in the voltage that must be applied to the modulating electrodes, thereby bringing about a new problem that an insulation failure occurs. Hence, its thickness should preferably be controlled to be from 0.1 µm to 200 µm, and particularly preferably from 1 µm to 10 µm. As previously mention ed, in the instance where the surface conductive electron-emitting device is used, the device of this type has a greater initial velocity (about 1 to 10 eV) of the electrons emitted therefrom when compared with other electron-emitting devices, so that the problems as discussed above become more serious. In the apparatus (A) of the present invention also, the problems like those discussed above may arise if the thickness (the thickness in the direction of electron-beam emission) is extremely large. Hence, the distance between the electron-emitting area of the electron-emitting device and the modulating electrode should preferably be controlled to be from 0.1 µm to 200 µm.

In the instance where the surface conductive electron-emitting device is used as the electron-emitting device, the width of its device electrode may preferably be controlled to be from 1 µm to 100 µm, and preferably from 1 µm to 10 µm. This more readily enables the above modulation of electron beams, and hence is desirable from the view point of improving the luminance contrast.

The apparatus (A) of the present invention will be more detailed below with reference to the drawings.

FIG. 1 is a view to illustrate a first embodiment of the apparatus (A) of the present invention. The numeral 31 denotes a rear plate; 32, a modulating electrode; 33, an insulating substrate; 34, a device wiring electrode; 35, a device electrode; and 36, an electron-emitting area.

Figure 11:
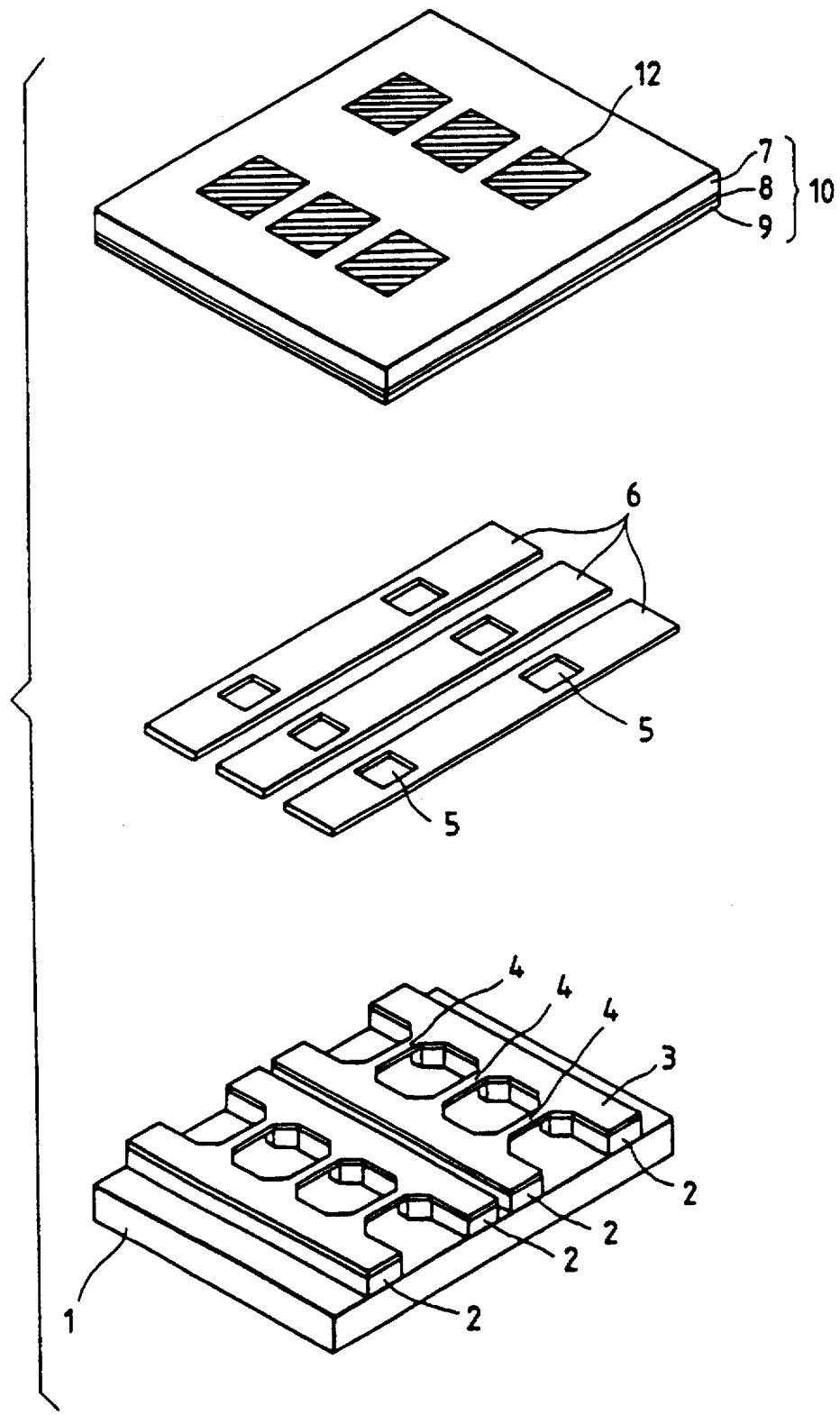

In this embodiment, the modulating electrode, provided between the electron-emitting device and the fluorescent member in the prior art shown in FIG. 11 previously mentioned; is disposed beneath the electron-emitting area 36, and the electron-emitting device (comprising the device electrode 35 and the electron-emitting area 36) and the modulating electrode 32 are laminatingly formed interposing the insulating substrate 33.

FIGS. 2A to 2D illustrate a process of preparing the electron-beam generator of the present embodiment, taking cross sections along the line A—A' in FIG. 1. A process of preparing the image display apparatus according to the present embodiment will be described here.

Figure 2A:
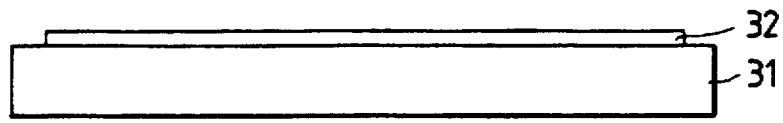
FIGS. 2A to 2D, 4A to 4E, 6, 7A to 7D and 10 are views each illustrating a process of preparing the electron-beam generator of the present invention.

(1) In the first place, the rear plate 31 is thoroughly cleaned, and a group of modulating electrodes 32 are formed in lines by the techniques of vacuum deposition and photolithography which are widely used (FIG. 2A). Such a rear plate 31 may be comprised of any insulating material such as glass or aluminum ceramics. The modulating electrode 32 may be made of any conductive material such as gold, nickel or tungsten, but may preferably be made of a material having a thermal expansion coefficient as near as possible to that of its substrate. For the modulating electrode in the present embodiment, a nickel material is used and a group of modulating electrodes are prepared with a width of 1.6 mm and a pitch of 2 mm each.

Figure 2B:
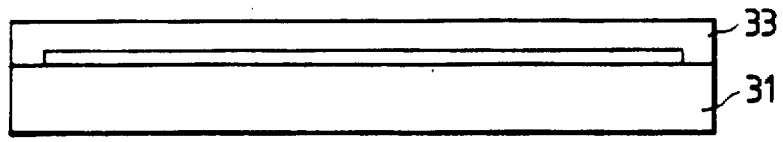

(2) Next, the insulating substrate 33 is formed using $SiO_2$ by vacuum deposition (FIG. 2B). $SiO_2$, glass, and other ceramic materials are suited as materials for the insulating substrate 33.

In the present embodiment, the substrate is formed with a thickness of 10 μm.

Figure 2C:
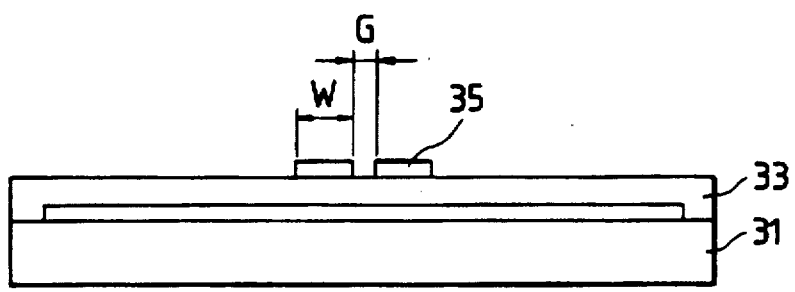

(3) Next, the electrode 35 and device wiring electrodes 34 (not shown in the cross section) are formed using an Ni material by vacuum deposition and etching (FIG. 2C). The device electrode 35 is formed with a thickness of 0.1 μm each. Such device wiring electrodes 34 may be made of any materials so long as they can be so prepared as to have a sufficiently low electrical resistivity. The device electrodes 35 are respectively connected to a device wiring electrode 34-a and a device wiring electrode 34-b so that each electron-emitting area 36 at which the device electrodes 35 are opposed to each other is formed.

Its electrode gap (G) may preferably be in the range of 0.1 μm to 10 μm. In the present embodiment, the gap is so formed as to be 2 μm. The length (l: see FIG. 1) corresponding to the electron-emitting area 36 is made to be 300 μm. The width of each device electrode 35 should preferably be as small as possible. In practice, however, it may preferably range from 1 μm to 100 μm, and most preferably from 1 μm to 10 μm. The electron-emitting area 36 is formed in the vicinity of the center of the modulating electrode 32. In the present embodiment, the device is so formed that the pitch of the group of device wiring electrodes 34 (a and b form a pair) is 2 mm and the pitch of the electron-emitting area is 2 mm.

Figure 2D:
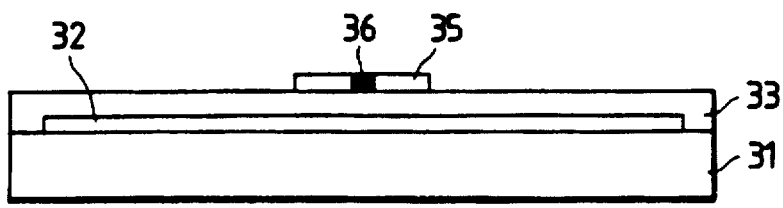

(4) Next, an ultrafine particle film is provided between the electrodes opposed to each other, using gas deposition, to form each electron-emitting area 36 (FIG. 2D). Pd is used here as material for the ultrafine particles. As other materials, metallic materials such as Ag and Au or oxide materials such as $SnO2$ and $In2O3$ are suitable, but by no means limited to these. In this embodiment, the average diameter of Pd particles is set to be about 100 Å, but by no means limited to this. Other than the gas deposition, for example, a process in which a dispersion comprising an organic metal is coated, followed by heat treatment to form an ultrafine-particle film between the electrodes, can also bring about the desired characteristics. In the present embodiment, the distance between the electron-beam emitting surface of the electron-emitting device and the modulating electrode is 10 μm, and the thickness of the electron-emitting device in the direction of electron beam emission is 0.1 μm.

(5) A face plate (like the face plate 10 as shown in FIG. 11) having a fluorescent member (an image forming member) is provided at 5 mm distance from the rear plate of the electron-beam generator prepared according to the process described above. The image display apparatus is thus prepared.

How to operate the present embodiment will be described below.

The voltage on the surface of the fluorescent member is set to be from 0.8 kV to 1.5 kV. In FIG. 1, a voltage pulse of 14 V is applied to a pair of device wiring electrodes 34-a and 34-b so that electrons are emitted from the plural electron-emitting devices arranged in linear fashion. The electrons thus emitted are brought under ON/OFF control of electron beams in accordance with information signals by applying a voltage to the group of modulating electrodes. The electrons drawn out by the modulating electrodes impinge against the fluorescent member under acceleration. The fluorescent member performs a line of display in accordance with the information signals. Next, a voltage pulse of 14 V is applied to the adjacent device wiring electrode 34-a and 34-b to carry out a line of display as in the above. This operation is successively repeated to form a picture an image. More specifically, having the group of electron-emitting devices serve as scanning electrodes, the scanning electrodes and the modulating electrodes form the XY matrix, and thus the image is displayed.

The surface-conductive electron-emitting device according to the present embodiment can drive in response to a voltage pulse of 100 picoseconds or less, and hence the displaying of an image in 1/30 second for one picture enables formation of 10,000 lines or more of scanning lines.

The voltage applied to the group of modulating electrodes 32 is −40 V or less, or 30 V or more, under which the electron beams are OFF-controlled or ON-controlled, respectively. The amount of electron beams continuously varies at voltages between −40 V and 30 V. Thus, it is possible to effect gradational display according to the magnitude of the voltage a applied to the modulating electrodes.

The reason why the electron beams can be controlled according to the magnitude of the voltage applied to the modulating electrode 32 is that the potential in the vicinity of the electron-emitting area 36 varies from plus values to minus values depending on the magnitude of the voltage at the modulating electrode and thus electron beams are accelerated or decelerated. Hence, it becomes impossible to control the distribution of electric fields in the vicinity of the electron-emitting area 36 unless the voltage applied to the modulating electrode 32 is increased with an increase in the width (W) of the device electrode 35.

As described above, since in the present embodiment the electron-emitting device and the modulating electrode are laminated interposing the insulating substrate, the alignment can be made with ease. At the same time, since a thin-film manufacturing technique is employed in the manufacture, it is possible to obtain a wide-screen, highly detailed display at a low cost. It is also possible to form the distances between the electron-emitting areas 36 and the modulating electrodes 32 with a very good accuracy, and hence an image display apparatus free of luminance non-uniformity and with a very uniform image can be obtained.

In the surface conductive electron-emitting device, electrons with an initial velocity of several volts are emitted in the vacuum. The present invention is very effective to the modulation for such a device, and can also achieve a superior luminance contrast of the displayed image.

In the present embodiment, an image display apparatus prepared with substantially the same constitution except that the insulating substrate is made to have a thickness of 0.1 μm can bring about substantially the same results. An image display apparatus in which the insulating substrate has a thickness of 200 μm can also bring about substantially the same results. In the present embodiment, an image display apparatus prepared with substantially the same constitution except that the device electrode has a thickness of 0.01 μ can also bring about substantially the same results.

Figure 3:
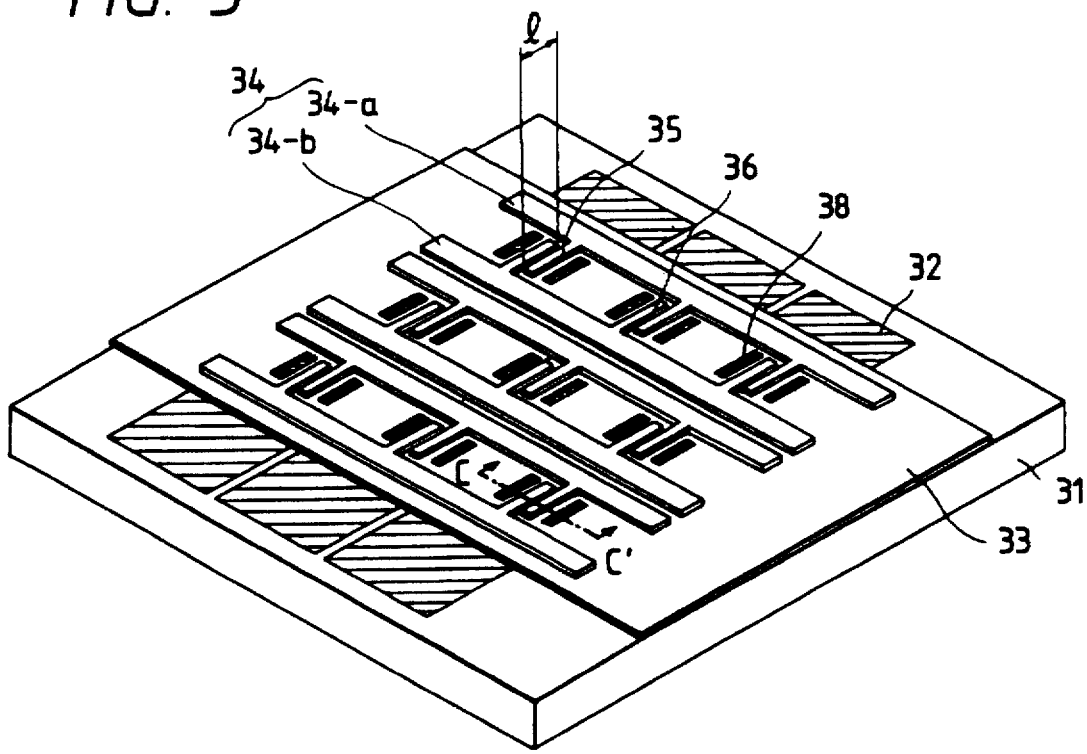

FIG. 3 is a view to illustrate a second embodiment of the the apparatus (A) of the present invention. FIGS. 4A to 4E are views to illustrate a process of preparing the electron-beam generator of the present embodiment, taking cross sections along the line C—C' in FIG. 3. A process of preparing the image display apparatus according to the present embodiment will be described here. The numeral 38 denotes a contact hole.

Figure 4A:
Figure 4B:
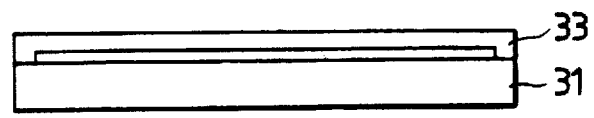

(1) A group of linear modulating electrodes 32 are formed in the same manner as in the first embodiment (FIG. 4A).

(2) An insulating substrate 33 is formed in the same manner as in the first embodiment (FIG. 4B) except that the insulating substrate 33 was made to have a thickness of 3 μm.

Figure 4C:
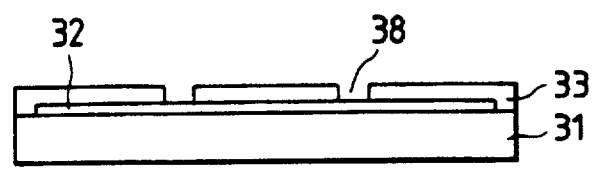

(3) Contact holes 38 as illustrated in FIGS. 3 and 4C are provided by etching. Such contact holes are formed by removing the insulating substrate at the positions between which a pair of device electrodes 35 are located. Namely, the modulating electrode 32 is uncovered through the contact holes.

Figure 4D:
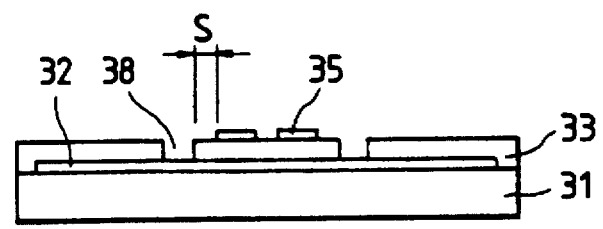

(4) Device electrodes 35 are formed in the same manner as in the first embodiment (FIG. 4D).

Figure 4E:
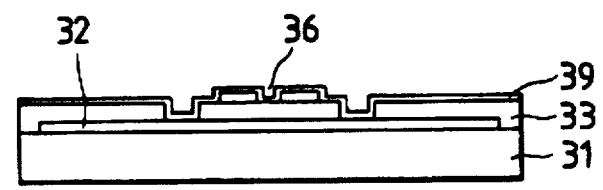

(5) Next, an organic palladium compound is coated on the entire surface of the substrate by dip coating. The coating formed is baked at 300° C. for 1 hour to deposit palladium fine particles on the entire surface of the substrate (FIG. 4E). The organic palladium compound used is CCP-4230 available from Okuno Seiyaku k. k. In the course of this process, not only the fine particles mainly composed of palladium which are electron-emitting materials are provided between the device electrodes 35 opposed to each other, but also conductive fine particles are deposited on the inner walls of the contact holes and the surface of the insulating substrate 33. Here, the surface of the insulating substrate may preferably have a sheet resistivity of from $0.5 \times 10^5$ Ω/□ to $1 \times 10^9$ Ω/□, and most preferably from $1 \times 10^5$ Ω/□ to $1 \times 10^7$ Ω/□.

In the present embodiment, the device electrode 35 is formed to have a thickness of 0.1 μm. The distance between the electron-emitting surface of the electron-emitting device and the modulating electrode is 3 μm, and the thickness of the electron-emitting device in the direction of electron beam emission is 0.1 μm.

(6) Using the electron-beam generator formed through the process described above, an image display apparatus is prepared in the same manner as in the first embodiment.

The contact hole 38 of the present embodiment may preferably have substantially the same size as the length (l) of the electron-emitting area 36 as shown in FIG. 3. The space (S) between the contact hole and the device electrode may preferably be from 10 μm to 500 μm, and most preferably from 25 μm and 100 μm.

In the present embodiment, electric currents flow through the contact holes 38 as a result of application of a voltage to the modulating electrode 32, and the potential on the surface of the insulating substrate is changed, so that the surface potential of the insulating substrate in the vicinity of the device electrode 35 can be controlled.

In the present embodiment, the voltage applied to the modulating electrodes 32 is −25 V or less, or 10 V or more, under which the electron beams are OFF-controlled or ON-controlled, respectively.

In the present embodiment, the voltage applied to the modulating electrodes can be reduced to about ½ with respect to that in the first embodiment. This enables great reduction of the cost of transistors used for applying the voltage to the modulating electrodes.

The second invention described below includes an;

electron-beam generator comprising an electron-emitting device and a modulating electrode capable of modulating an electron beam emitted from the electron-emitting device, in accordance with an information signal; wherein the electron-emitting device and the modulating electrode are disposed on the same plane of an insulating substrate.

An image display apparatus making use of the generator, i.e., the image display; comprises an electron-emitting device, a modulating electrode capable of modulating an electron beam emitted from the electron-emitting device, in accordance with an information signal, and an image forming member capable of forming an image by irradiation with the electron beam; wherein the modulating electrode and the electron-emitting device are disposed on the same plane with an insulating substrate (hereinafter "the apparatus (B) of the present invention").

In the apparatus (B) of the present invention, the providing of both the electron-emitting device and the modulating electrode on the same plane with the insulating substrate keeps substantially equal the distances between the electron-emitting areas of the plural electron-emitting devices and the modulating electrodes. The insulating substrate may also preferably be formed with a uniform thickness. The space between the device electrode of the electron-emitting device and the modulating electrode may preferably be kept at 30 μm or less so long as the electrical insulation between both electrodes can be maintained, and particularly preferably from 5 μm to 20 μm. This is because an extremely excessive wideness of the space between them makes insufficient the modulation of electron beams emitted from the electron-emitting device, bringing about poor luminance contrast, or requires an excessive increase of the voltage that must be applied to the modulating electrode, bringing about the new problem that insulation failure occurs. In particular, in the instance where the surface-conductive electron-emitting device as previously described is used as the electron-emitting device, this device, as previously mentioned, has so great an initial velocity of emitted electrons compared with other electron-emitting devices that an excessively wide space between the device electrode and the modulating electrode requires an increase of the voltage to be applied to the modulating electrode, resulting in a substantial insufficiency of the modulation of electron beams to bring about the new problem that luminance contrast becomes poor.

In the instance where the surface-conductive electron-emitting device is used as the electron-emitting device, the width of its device electrode may preferably be controlled to be from 1 μm to 100 μm, and preferably from 1 μm to 10 μm. This more readily enables the above modulation of electron beams, and hence is desirable from the view point of improving the luminance contrast.

The apparatus (B) of the present invention will be more detailed below with reference to the drawings.

Figure 5:
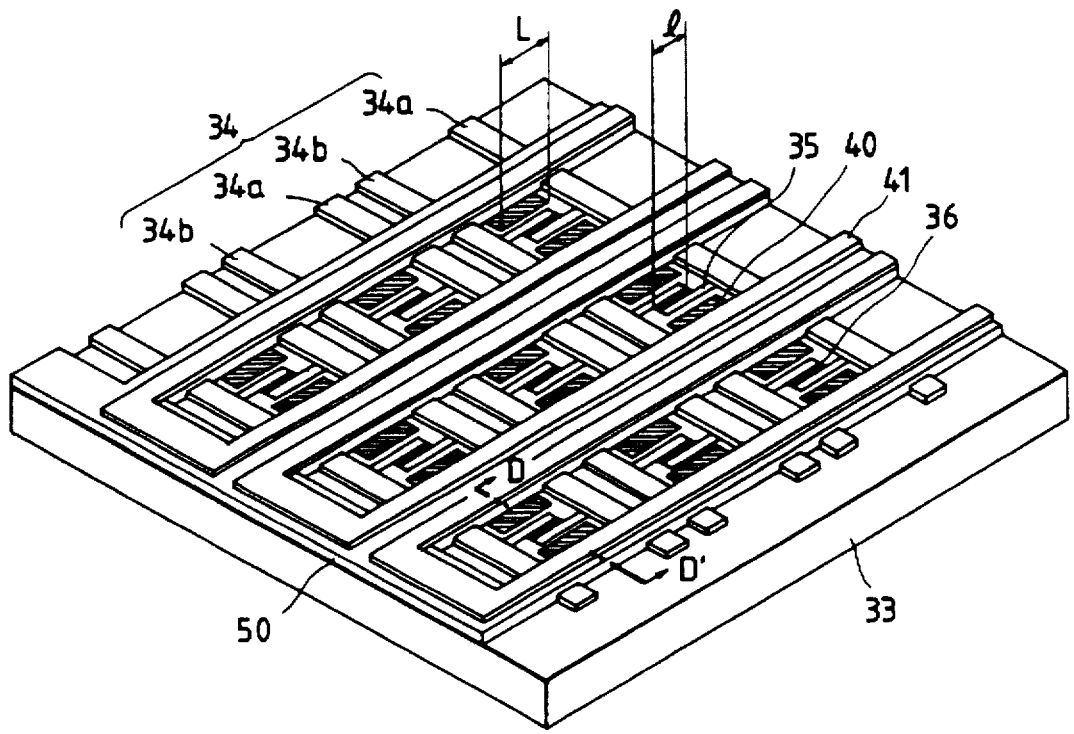
Figure 6:
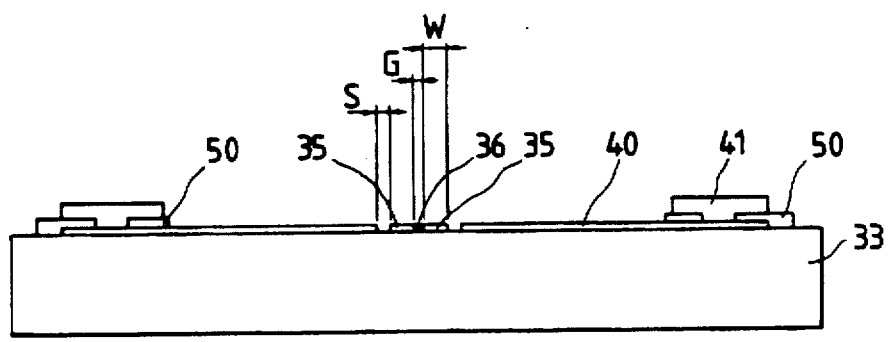

FIG. 5 schematically illustrates the constitution of a first embodiment of the apparatus (B) of the present invention. FIG. 6 is a cross section along the line D—D' in FIG. 5. The numeral 33 denotes an insulating substrate; 35, a device electrode of a surface conductive electron-emitting device; 36, an electron-emitting area; 40, a modulating electrode; 34 (34-a, 34-b), a device wiring electrode; 50, an insulating material film and 41, a modulation wiring electrode.

A linear electron-emitting device is formed by disposing between the device wiring electrodes 34-a and 34-b a plurality of electron-emitting devices (surface-conductive electron-emitting devices) each having the electron-emitting area 36 and a pair of device electrodes 35. Modulating electrodes 40 are disposed at the positions between which the device electrodes 35 are located, and, as shown in FIG. 6, connected to the modulating wiring electrode 41 through contact holes of the insulating material film 50. This is hereinafter called "linear modulating electrode". Such linear electron-emitting device and linear modulating electrode 41 are provided in plurality and in parallel. A group of linear electron-emitting devices and a group of linear modulating electrodes are thus formed.

In the present embodiment, a face plate 10 having the image forming member 9 like the one previously described is provided on the upper part of the substrate provided with the above electron-emitting devices and modulating electrodes. The image display apparatus is thus prepared.

The present embodiment is characterized in that the surface conductive electron-emitting device and the modulating electrode 40 are provided on the same plane of the insulating substrate 33. The width (W) of the device electrode 35 may preferably be from 1 µm to 50 µm, and desirably from 3 µm to 20 µm from the viewpoint of practical use, but is by no means limited to these. The smaller the width (W) the device electrode is, the smaller the voltage applied to the modulating electrode 40 can be made. However, a width smaller than the lower limit of the above range may bring about the disadvantage that the resistance of the device electrode is increased. The gap (G) between the device electrodes 35, which corresponds to the electron-emitting area, may be from 0.5 µm to 5 µm from the viewpoint of practical use, but is by no means limited thereto. Next, for the formation of the electron-emitting area 36, a dispersion of the CCP-4230 organic palladium compound available from Okuno Seiyaku k. k. may be coated, followed by baking in the atmosphere at a temperature of 300° C., to provide between the device electrodes a film of mixed fine particles of palladium fine particles and palladium oxide fine particles. The electron-emitting area is thus formed. The method therefor, however, is by no means limited thereto. Next, the space (S) between the device electrode 35 and the modulating electrode 40 should be as small as possible and may preferably be kept at 30 µm or less so long as the electrical insulation between both the electrodes can be maintained. From the viewpoint of practical use, it should be in the range of from 5 µm to 20 µm. Such a space (S) greatly influences the voltage applied to the modulating electrode 40, and the voltage applied to the modulating electrode 40 increases with an increase in the space (S). The length (l) at the electron-emitting area as shown in FIG. 5 is the length through which the device electrodes 35 are opposed to each other, and electrons are uniformly emitted from the area of the length (l). The width (L) of the modulating electrode 40 must be made longer than the length (l) of the electron-emitting area 36. For example, assuming that the length (l) of the electron-emitting area 36 in the range of from 50 µm to 150 µm, the width (L) of the modulating electrode 40 in the range of from 100 to 200 µm from the viewpoint of practical use, though variable depending on the width (W) of the device electrode or the space (S) between the device electrode and modulating electrode. Here, when l>L, it becomes impossible for the modulating electrode 40 to make ON/OFF control of the electrons emitted from the electron-emitting area. Even if possible, the voltage applied to the modulating electrode 40 must be increased.

Component materials in the present embodiment will be described below. As the insulating substrate 33, glass materials are commonly used, but insulating materials such as $SiO_2$ and alumina ceramics may also be used. The device electrode 35 and the modulating electrode 40 should preferably be formed of metallic materials such as gold and nickel, but any other conductive materials may also be used without any difficulty. The insulating material film 50 is commonly formed of an insulating material film of $SiO_2$ or the like, to which, however, the material is by no means limited so long as the insulation between the device wiring electrode 34 and the modulation wiring electrode 41 can be achieved.

A process for preparing the electron-beam generator and image display apparatus according to the present embodiment will be described below with reference to FIG. 7.

Figure 7A:
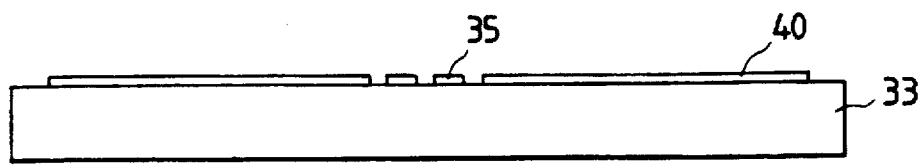

(1) In the first place, the insulating substrate 33 is thoroughly cleaned, and the device electrode 35 and the modulating electrode 40 are formed by the techniques of vacuum deposition and photolithography which are widely used (FIG. 7A). Here, nickel materials are used as materials for the electrodes, to which, however, their materials are not limited so long as they are conductive materials. The electrodes are so formed that the gap (G) between device electrodes is 2 µm, the width (W) of the device electrode is 10 µm, the space (S) between the device electrode 35 and the modulating electrode 40 is 5 µm, the length (l) of the electron-emitting area is 150 µm, and the width (L) of the modulating electrode is 220 µm. Here, the device electrode 35 and modulating electrode 40 are formed by a like process, i.e., using like materials. They may also be formed using respectively different materials. In the present embodiment, all the electron-emitting devices, linear electron-emitting devices, and linear modulating electrodes are formed with a pitch of 1.0 mm.

Next, the device wiring electrode 34 is formed which is necessary for simultaneously driving a plurality of electron-emitting devices. As materials therefor, metallic materials such as gold and aluminum are suitable. For the purpose of simultaneously driving a number of electron-emitting devices, it is more preferable to use materials having a small electrical resistivity. In the present embodiment, the device wiring electrode is formed using a material mainly composed of copper to have a thickness of 1.5 µm.

Figure 7B:
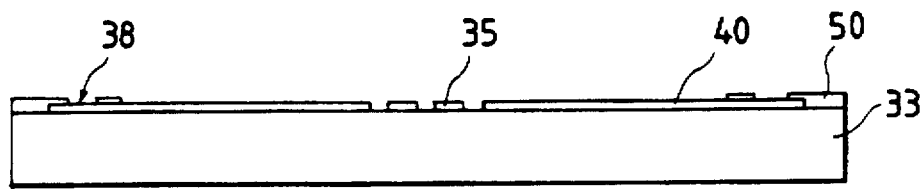

(2) Next, the insulating material film 50 is provided on the end portion of the modulating electrode 40. Here, the insulating material film 50 is provided in the direction of right angles to the device wiring electrode 34, and the modulation wiring electrode 41 and the device wiring electrode 34 must be electrically insulated with each other. For that purpose, the insulating material film 50 must be formed with a thickness larger than that of the device wiring electrode 34. In the present embodiment, it is formed using $SiO_2$ to have a thickness of 3 µm. Next, a contact hole 38 is formed in the insulating material film 50 so that the modulating electrode 40 and the modulation wiring electrode 41 can be electrically connected (FIG. 7B).

Figure 7C:
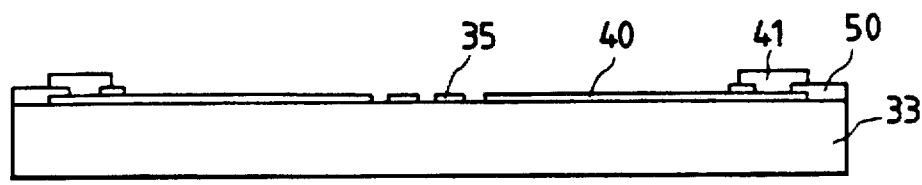

(3) Next, the modulation wiring electrode 41 is formed on the insulating material film 50. Here, the wiring is made in such a manner that the modulating electrode is connected through the contact hole 38 and at the same time the same voltage is applied to the two modulating electrodes between which the electron-emitting area 36 is disposed (FIG. 7C). In the present embodiment, this wiring is made on the end portion of the substrate. The modulation wiring electrode 41 in the present embodiment is formed of a Ni material with a thickness of 5 µm.

Figure 7D:
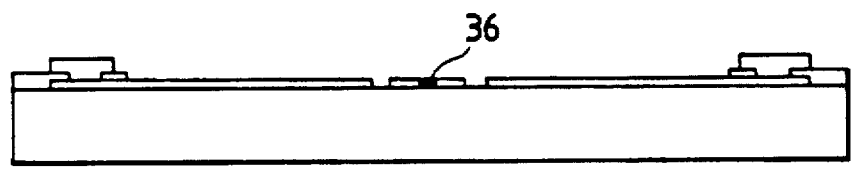

(4) Next, a fine-particle film is formed between the device electrodes to form the electron-emitting area 36 (FIG. 7D). Such a fine-particle film is formed by the spin coating of an organic palladium fine-particle dispersion, followed by baking at about 300° C. for 30 minutes. The fine-particle film obtained is a film comprising mixed particles of palladium and palladium oxide. The patterning can be carried out by the lift-off technique widely used in usual cases. Here, the fine-particle film may be not only provided between the device electrodes 35 but also provided on the device electrodes 35.

The device electrode 35 and the modulating electrode 40 may each suitably have a thickness of from 0.05 µm to 10 µm, and preferably from 0.1 µm to 2 µm from the viewpoint of practical use. In the present embodiment, they are each formed with a thickness of 0.2 µm. The electron-emitting device in the present embodiment has a thickness of 0.2 µm in the direction of electron emission.

(5) A face plate (like the face plate 10 as shown in FIG. 11) having a fluorescent member (an image forming member) is provided at 5 mm distance from the rear plate having thereon the electron source and the modulating electrode 40. The image display apparatus is thus prepared.

How to operate the present embodiment will be described below.

The voltage on the surface of the fluorescent member is set to be from 0.8 kV to 1.5 kV. In FIG. 5, a voltage pulse (14 V in the present embodiment) is applied to a pair of device wiring electrodes 34-a and 34-b so that electrons are emitted from the plural electron-emitting devices arranged in linear fashion. The electrons thus emitted are brought under ON/OFF control of electron beams in accordance with information signals by applying a voltage to the group of linear modulating electrodes. The electrons drawn out by the modulating electrodes 40 impinge against the fluorescent member 9 under acceleration. The fluorescent member 9 performs a line of display in accordance with the information signals. Next, a voltage pulse (of 14 V in the present embodiment) is applied to the adjacent device wiring electrode 34-a and 34-b to carry out a line of display as in the above. This operation is successively repeated to form a picture of an image. More specifically, having the group of electron-emitting devices serve as scanning electrodes, the scanning electrodes and the modulating electrodes form the XY matrix, and thus the image is displayed. The pulse voltage applied to the device may depends on the materials or structure of the device, but may commonly be in the range of from 8 to 20 V.

The surface conductive electron-emitting device according to the present embodiment can drive in response to a voltage pulse of 100 picoseconds or less, and hence the displaying of an image in 1/30 second for one picture enables formation of 10,000 lines or more of scanning lines.

The voltage applied to the group of modulating electrodes is −36 V or less, or 26 V or more, under which the electron beams are OFF-controlled or ON-controlled, respectively. The amount of electron beams continuously varies at voltages between −36 V and 26 V. Thus, it is possible to effect gradational display according to the magnitude of the voltage applied to the modulating electrodes 40.

The reason why the electron beams can be controlled according to the magnitude of the voltage applied to the modulating electrode 40 is that the potential in the vicinity of the electron-emitting area 36 varies from plus values to minus values depending on the magnitude of the voltage at the modulating electrode and thus electron beams are accelerated or decelerated. Hence, it becomes impossible to control the distribution of electric fields in the vicinity of the electron-emitting area 36 unless the voltage applied to the modulating electrode 40 is increased with an increase in the width (W) of the device electrode 35 or the space (S) between the device electrode 35 and modulating electrode 40. In the present embodiment, the modulating electrodes 40 are provided at the positions between which the electron-emitting area 40 is located. The present invention, however, is by no means limited to this, and, even when one modulating electrode is provided, the electron beam can be similarly controlled if the modulation voltage is increased.

As described in the above, since in the present embodiment the electron-emitting device and the modulating electrode are provided on the same plane with the insulating substrate, the alignment can be made with ease. At the same time, since a thin-film manufacturing technique is employed in the manufacture, it is possible to obtain a wide-screen, highly detailed display at a low cost. It is also possible to form the distances between the electron-emitting areas 36 and the modulating electrodes 40 with very good accuracy, and hence an image display apparatus free of luminance non-uniformity and with a very uniform image can be obtained.

In the surface conductive electron-emitting device, electrons with an initial velocity of several volts are emitted in the vacuum. The present invention is very effective to the modulation of such a device, and can also achieve a superior luminance contrast of the displayed image.

In the present embodiment, an image display apparatus prepared with substantially the same constitution except that the insulating substrate is made to have a thickness of 0.1 µm can bring about substantially the same results. An image display apparatus in which the insulating substrate has a thickness of 200 µm can also bring about substantially the same results.

Figure 8:
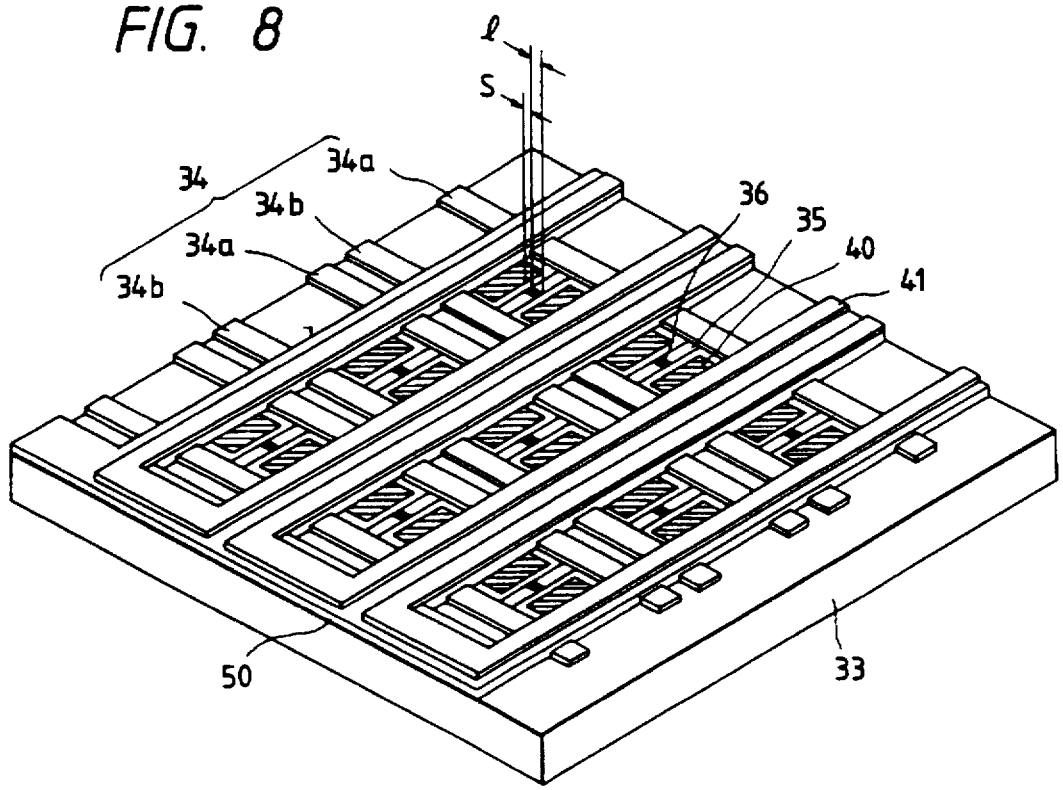

FIG. 8 illustrates the constitution of a second embodiment of the apparatus (B) of the present invention.

In the present embodiment, the form of the electron-emitting device in the first embodiment described above is changed. In the electron-emitting device according to the present embodiment, the width of the device electrode 35 forms the length (l) of the electron-emitting area 36.

The image display apparatus according to the present embodiment can be prepared by applying the same method as in the above first embodiment, and hence the description thereon is not repeated.

In the present embodiment, the electrodes are so formed that the length (l) of the electron-emitting area is 10 µm, and space (S) between the modulating electrode 40 and the device electrode 35 is 5 µm. Other component members have substantially the same dimensions as those in the first embodiment described above.

Each of the device electrode 35 and the modulating electrode 40 is so formed as to have a thickness of 0.1 µm. The electron-emitting device in the present embodiment has a thickness of 0.1 µm in the direction of electron emission.

According to the present embodiment, compared with the above first embodiment, electrons are emitted in a smaller amount, but it is feasible to control the focusing and divergence of electron beams, so that a very highly detailed image can be displayed. The distance between the electron-emitting area 36 and the modulating electrode 40 can also be made small, so that the ON/OFF control of electron beams can be carried out at a low voltage.

Figure 9:
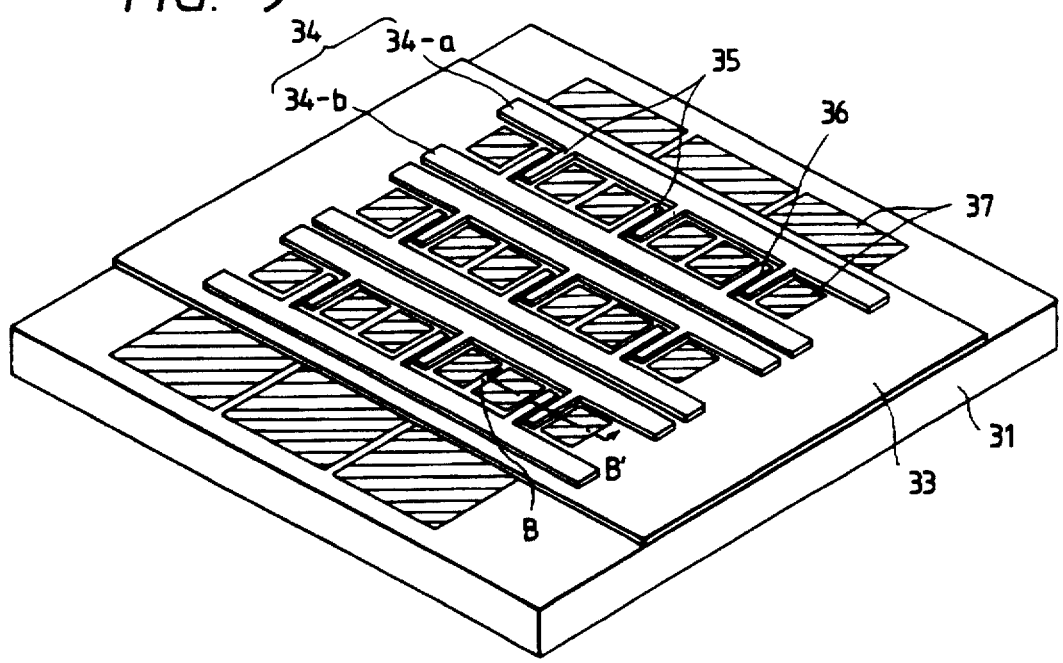

FIG. 9 illustrates the constitution of a third embodiment of the apparatus (B) of the present invention.

Figure 10:
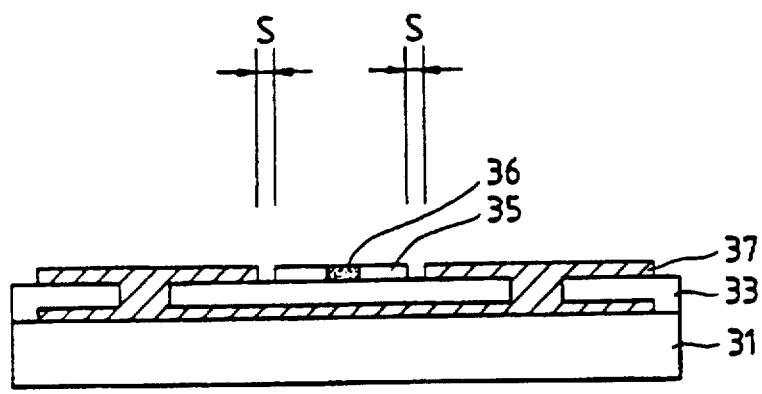
Figure 12:
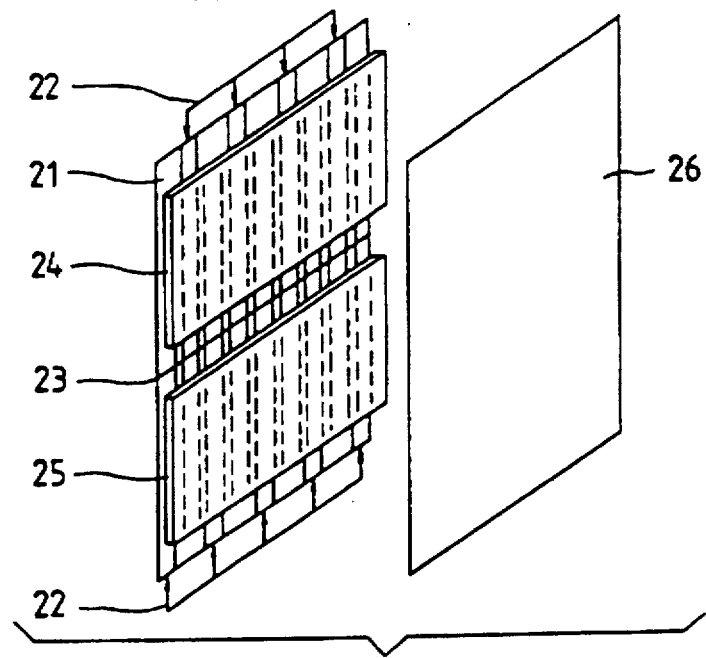
FIGS. 11 and 12 are views each showing the conventional image display apparatus.

FIG. 10 is a cross section along the line B–B' in FIG. 9. The numeral 37 denotes a group of modulating electrodes of the present embodiment. In the present embodiment, the modulating electrodes used in the first embodiment of the apparatus (A) of the present invention previously described are also disposed on the same plane with the electron-emitting areas.

The image display apparatus according to the present embodiment as shown in FIG. 9 can be prepared by the same vacuum deposition and etching as used in the first embodiment of the apparatus (A) of the present invention previously described, and hence the description thereon is not repeated. It is also prepared with the same forms or shapes as those in the first embodiment of the apparatus (A) of the present invention previously described. The device electrode is so formed as to have a thickness of 0.1 μm. The electron-emitting device in the present embodiment has a thickness of 0.1 μm in the direction of electron beam emission. In FIG. 10, the space (S) between the device electrode 35 and the modulating electrode 37 may preferably be not more than 30 μm, and more preferably from 5 to 20 μm from the viewpoint of practical use. In the present embodiment, it is set to be 10 μm.

The voltage applied to the modulating electrode 37 in the present embodiment is −26 V or less, or 10 V or more, under which the electron beams can be OFF-controlled or ON-controlled, respectively. The amount of electron beams can be continuously controlled at voltages between −25 V and 10 V, like the first embodiment of the apparatus (A) of the present invention previously described.

In the present embodiment, the voltage applied to the modulating electrodes 37 can be reduced to about ½ with respect to that in the first embodiment of the apparatus (A) of the present invention previously described. This enables great reduction of the cost of transistors used for applying the voltage to the modulating electrodes.

As described above, compared with the first embodiment of the apparatus (A) of the present invention previously described, the present embodiment enables easy control of the potential in the vicinity of the electron-emitting area 36 even when the voltage applied to the modulating electrode is set to a low level.

What is claimed is:

1. An electron-beam generator, comprising:
   a plurality of electron-emitting devices that emit electrons;
   a plurality of modulating electrodes each capable of modulating an electron-beam emitted from a respective one of said plurality of electron-emitting devices in response to an information signal; and
   an insulating substrate, said plurality of electron-emitting devices and said plurality of modulating electrodes being disposed on the same plane of said insulating substrate, such that each of said plurality of modulating electrodes permits emission of electrons from an upper surface of a respective one of said plurality of electron-emitting devices above the plane of said insulating substrate, and a linear electron-emitting device is formed by arranging a plurality of said electron-emitting devices electrically connected by common wiring.

2. An electron-beam generator according to claim 1, wherein said insulating substrate has a uniform thickness.

3. An electron-beam generator according to claim 1, wherein a plurality of said electron-emitting devices are arranged, and the distances between said modulating electrode and individual electron-emitting devices are all equal.

4. An electron-beam generator according to claim 1, wherein the distance between said modulating electrode and said electron-emitting device is not more than 30 μm.

5. An electron-beam generator according to claim 1, wherein said electron-emitting device has a thickness of from 0.01 μm to 200 μm in the direction of electron-beam emission.

6. An electron-beam generator according to claim 1, wherein said electron-emitting device is a surface-conductive electron-emitting device.

7. An electron-beam generator according to claim 1, wherein said electron-emitting device has an electron-emitting area between electrodes provided on said insulating substrate, and electrons are emitted from said electron-emitting area by applying a voltage between said electrodes.

8. An electron-beam generator according to claim 1, wherein said electron-emitting device and said modulating electrode each independently have a means for applying a voltage.

9. An electron-beam generator according to claim 1, wherein said electron-emitting device and said modulating electrode are made of the same material.

10. An electron beam generator as set forth in claim 1, further comprising a plurality of said linear electron-emitting devices and a plurality of said modulating electrodes disposed so as to form an XY matrix.

11. An image display apparatus, comprising:
    a plurality of electron-emitting devices that emit electrons;
    a plurality of modulating electrodes each capable of modulating an electron beam emitted from a respective one of said plurality of electron-emitting devices in response to an information signal;
    an image forming member capable of forming an image by irradiation with an electron beam; and
    an insulating substrate, said plurality of modulating electrodes and said plurality of electron-emitting devices being disposed on the same plane of said insulating substrate, such that each of said plurality of modulating electrodes permits emission of electrons from a respective one of said plurality of electron-emitting devices to an upper space above the plane of said insulating substrate, and a linear electron-emitting device is formed by arranging a plurality of said electron-emitting devices electrically connected by common wiring.

12. An image display apparatus according to claim 11, wherein said insulating substrate has a uniform thickness.

13. An image display apparatus according to claim 11, wherein a plurality of said electron-emitting devices are arranged with respect to said modulating electrode, and the distances between said modulating electrode and individual electron-emitting devices are all equal.

14. An image display apparatus according to claim 11, wherein the distance between said modulating electrode and said electron-emitting device is not more than 30 μm.

15. An image display apparatus according to claim 11, wherein said electron-emitting device has a thickness of from 0.01 μm to 200 μm in the direction of electron beam emission.

16. An image display apparatus according to claim 11, wherein said electron-emitting device is a surface conductive electron-emitting device.

17. An image display apparatus according to claim 11, wherein said electron-emitting device has an electron-emitting area between electrodes provided on said insulating substrate, and electrons are emitted from said electron-emitting area by applying a voltage between said electrodes.

18. An image display apparatus according to claim 11, wherein a linear electron-emitting device, which is formed by arranging a plurality of said electron-emitting device, and a plurality of said modulating electrode plurality are so disposed as to form an XY matrix.

19. An image display apparatus according to claim 11, wherein said electron-emitting device and said modulating electrode each independently have a means for applying a voltage.

20. An image display apparatus according to claim 11, wherein said electron-emitting device and said modulating electrode are made of the same material.

21. An image display apparatus as set forth in claim 11, further comprising a plurality of said linear electron-emitting devices and a plurality of said modulating electrodes disposed so as to form an XY matrix.

* * * * *

UNITED STATES PATENT AND TRADEMARK OFFICE
CERTIFICATE OF CORRECTION

PATENT NO. : 5,757,123
DATED : May 26, 1998
INVENTOR(S) : Nomura et al.

It is certified that error appears in the above-identified patent and that said Letters Patent is hereby corrected as shown below:

COLUMN 1:

Line 7, "Ser." should read --of application Ser. No.-- and "497,072" should read --05/497,072--.

COLUMN 5:

Line 45, "is" (first occurrence) should be deleted.
Line 48, "here" should read --where--.

COLUMN 10:

Line 14, "display;" should read --display apparatus,--.
Line 63, "an insulating substrate;" should read --a rear plate;--.

UNITED STATES PATENT AND TRADEMARK OFFICE
CERTIFICATE OF CORRECTION

PATENT NO. : 5,757,123

DATED : May 26, 1998

INVENTOR(S) : Nomura et al.

It is certified that error appears in the above-identified patent and that said Letters Patent is hereby corrected as shown below:

COLUMN 15:

Line 13, "electrode" should read --electrode 35--.

Signed and Sealed this

Eleventh Day of May, 1999

Attest:

Q. TODD DICKINSON

Attesting Officer    Acting Commissioner of Patents and Trademarks